United States Patent [19]
Tagnon

[11] 3,804,153
[45] Apr. 16, 1974

[54] DEVICE FOR POSITIONING AND HOLDING A LENS MOUNTING BLOCK MOLD

[75] Inventor: Luc André Tagnon, Saint Mande, France

[73] Assignee: Essilor International (Compagnie Generale d'Optique), Paris, France

[22] Filed: Sept. 28, 1972

[21] Appl. No.: 292,975

[30] Foreign Application Priority Data
Sept. 29, 1971 France.............................. 71.35050

[52] U.S. Cl.................................. 164/332, 425/808
[51] Int. Cl....................... B22d 19/00, B29d 11/00
[58] Field of Search.................... 164/332, 334, 112; 425/408

[56] References Cited
UNITED STATES PATENTS

| | | | |
|---|---|---|---|
| 3,257,686 | 6/1966 | Merker et al.................... | 164/332 X |
| 3,431,688 | 3/1969 | Rudd et al....................... | 164/112 X |
| 3,710,849 | 1/1973 | Hines et al....................... | 425/808 X |

*Primary Examiner*—Robert D. Baldwin
*Attorney, Agent, or Firm*—Robert E. Burns; Emmanuel J. Lobato

[57] ABSTRACT

This device for positioning and holding in the proper location, on the convex face of an ophthalmic lens, a mold for casting, on said lens face, a metal block or gland permitting the subsequent mounting of the lens equipped with said metal block in a predetermined position on the spindle of a spectacle lens trimming and/or bevelling machine, comprises a base plate carrying a circular seat having its axis coincident with the sighting axis along which the lens is observed for positioning same and superposed to the fixed image of a reference cross-line centered to said axis; a mold support movable in relation to said base plate from a seat clearing position permitting the observation of the lens along said sighting axis to a molding position in which the mold can be brought into direct contact with the convex face of the lens.

7 Claims, 6 Drawing Figures

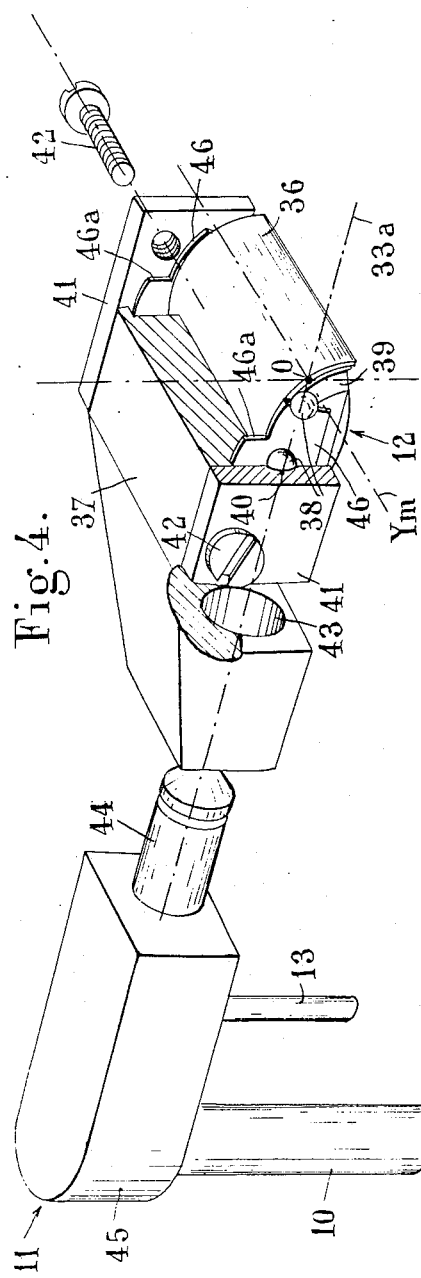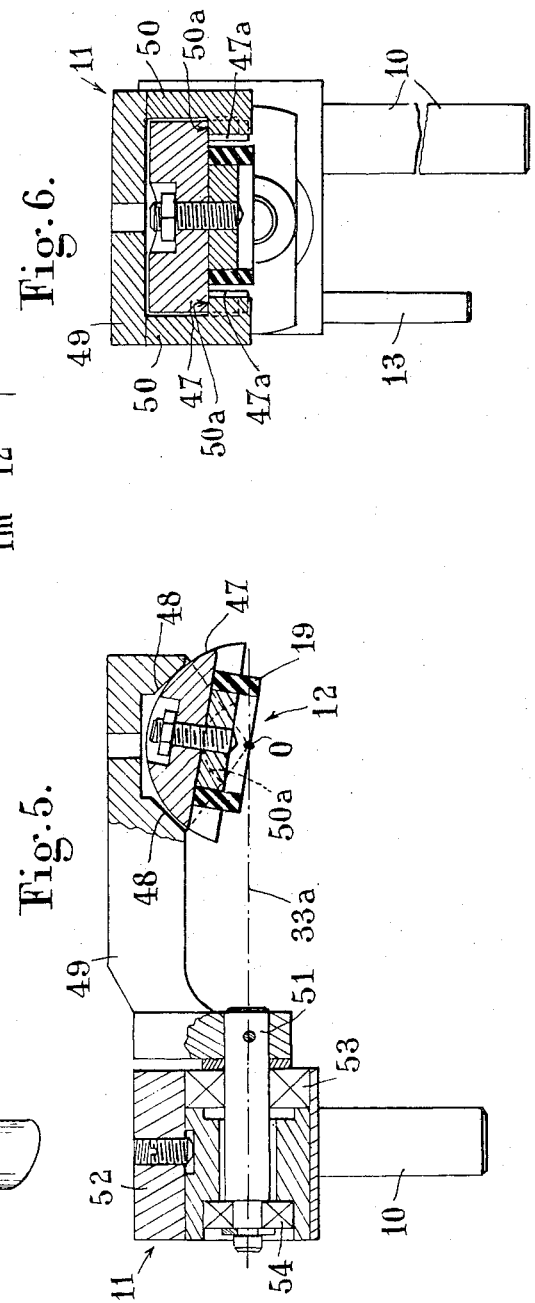

DEVICE FOR POSITIONING AND HOLDING A LENS MOUNTING BLOCK MOLD

FIELD OF THE INVENTION

The present invention relates to device designed for positioning and holding in the proper location, on the convex face of an ophthalmic lens, a mould for casting, on said lens face, a metal block or gland permitting the subsequent mounting of the lens equipped with said metal block in a predetermined position on the spindle of a spectacle-lens trimming and/or bevelling machine.

BACKGROUND OF THE INVENTION

The applicant already proposed an elaborated device for carrying out such metal block (cf. U.S.A. Pat. application No. 280,800, filed on Aug. 15, 1972 and entitled "Apparatus for fixing mounting means on spectacle lenses."

The applicant also proposed a centering device for locating in the proper position a flexible suction cup on a spectacle lens for subsequently permitting the mounting of the spectacle lens equipped with said suction cup in a predetermined position on the spindle of a trimming and/or bevelling machine (French Pat. No. 1,493,482). For various reasons already set forth in the above-mentioned patent application, in the centering device described in the aforementioned French patent the simple substitution of a gland-forming mould for the suction cup would lead to the obtaining of a metal block or gland which, although properly centered in relation to the lens, would nevertheless have such orientation, in the case of lenses having a strongly prismatic general configuration, that it would not fit exactly to the lens surface, and that when the lens is mounted on the spindle of the trimming and bevelling machine it would not be possible to trim the lens with precision and obtain along its contour, after this trimming operation, a bevel located at a constant spacing from the edge of the front convex surface of the trimmed lens.

SUMMARY OF THE INVENTION

It is the primary object of the present invention to provide a device considerably simpler than that described in the above-mentioned patent application for casting a metal block or gland on one face of an ophthalmic lens, this device being intended notably for use in combination with the centering device described in the above-mentioned French patent, or any other centering device of the axial sighting or pointing type, adapted to receive the lens to be centered and permitting the orientation or training and the accurate positioning of said lens in relation to a reference system.

To this end, this invention provides a device for positioning and keeping in contact with the convex face of an ophthalmic lens a mould designed for casting a metal block adhering to said face and permitting subsequently the mounting of said lens on the spindle of a trimming and bevelling machine, said lens being observed, for the accurate positioning thereof, along a sighting axis, and superposed to the fixed image of a cross-line centered to said sighting axis, this device being characterized in that it comprises a base plate carrying a circular seat having its axis coincident with said sighting axis and adapted to receive the concave face of said lens; a mould support movable in relation to said base plate from a seat-clearing position permitting the observation of said lens along the sighting axis to a modulating position permitting of bringing a mould into direct contact with the convex face of the lens; a mould movable in relation to said mould support and comprising a substantially flat bottom and a flexible lateral skirt surrounding said bottom and having a free edge adapted to engage the convex face of said lens and extending in a plane substantially parallel to said bottom; means for positioning said support in the moulding position, which are associated with guide means permitting a movement of translation of said support when said support is in the moulding position, parallel to the seat axis; first means for guiding said mould during the rotational movements thereof about a first axis fixed in relation to said support, said first axis, in the moulding position of said support, being parallel to one arm of the image of the cross-line and secant and perpendicular to the seat axis; and other means for guiding the mould during the rotational movements thereof about a second axis fixed in relation to said mould, said second axis being secant and perpendicular to said first axis, the point of intersection of said first and second axes lying in the plane containing the free edge of said mould skirt or in close proximity of said plane in the inner space of said mould, and, in the moulding position of said support, on the seat axis proper.

In actual practice, this positioning device may be mounted to the frame structure of a centering device such as the one described and illustrated in the above-mentioned French patent, in such position that the sighting axis of this last-mentioned centering device be coincident with the axis of the circular seat of the positioning and holding device of this invention, and that in the moulding position of the mould support, the first axis of rotation of the mould be parallel to one arm of the image of said reference cross-line and positioned in the plane containing said one arm and said signting axis (or the seat axis). When the mould support is in its seat-release or clearing position, the ophthalmic lens can be laid with its concave face down upon said seat and then centered and oriented manually to the proper position in relation to said reference cross-line. The mould support may subsequently be brought to its moulding position and moved towards the lens until its flexible skirt engages the convex face of the lens. Then, due to the possibility of rotating the mould about two axes, the mould will properly bear against the convex face of the lens, in such position and with such orientation as to eventually permit an accurate trimming and a likewise accurate bevelling of the contour of the trimmed lens, even if the latter has a strongly prismatic general configuration.

BRIEF DESCRIPTION OF THE DRAWINGS

A detailed description of the present invention will now be given with reference to the attached drawings, in which:

FIG. 4 is a perspective view showing a modified form of embodiment of one portion of the device according to this invention;

FIGS. 5 and 6 are part-sectional views showing another modified form of embodiment of the portion of the device which is shown in FIG. 4.

DESCRIPTION OF THE PREFERRED EMBODIMENTS

Figure 1:
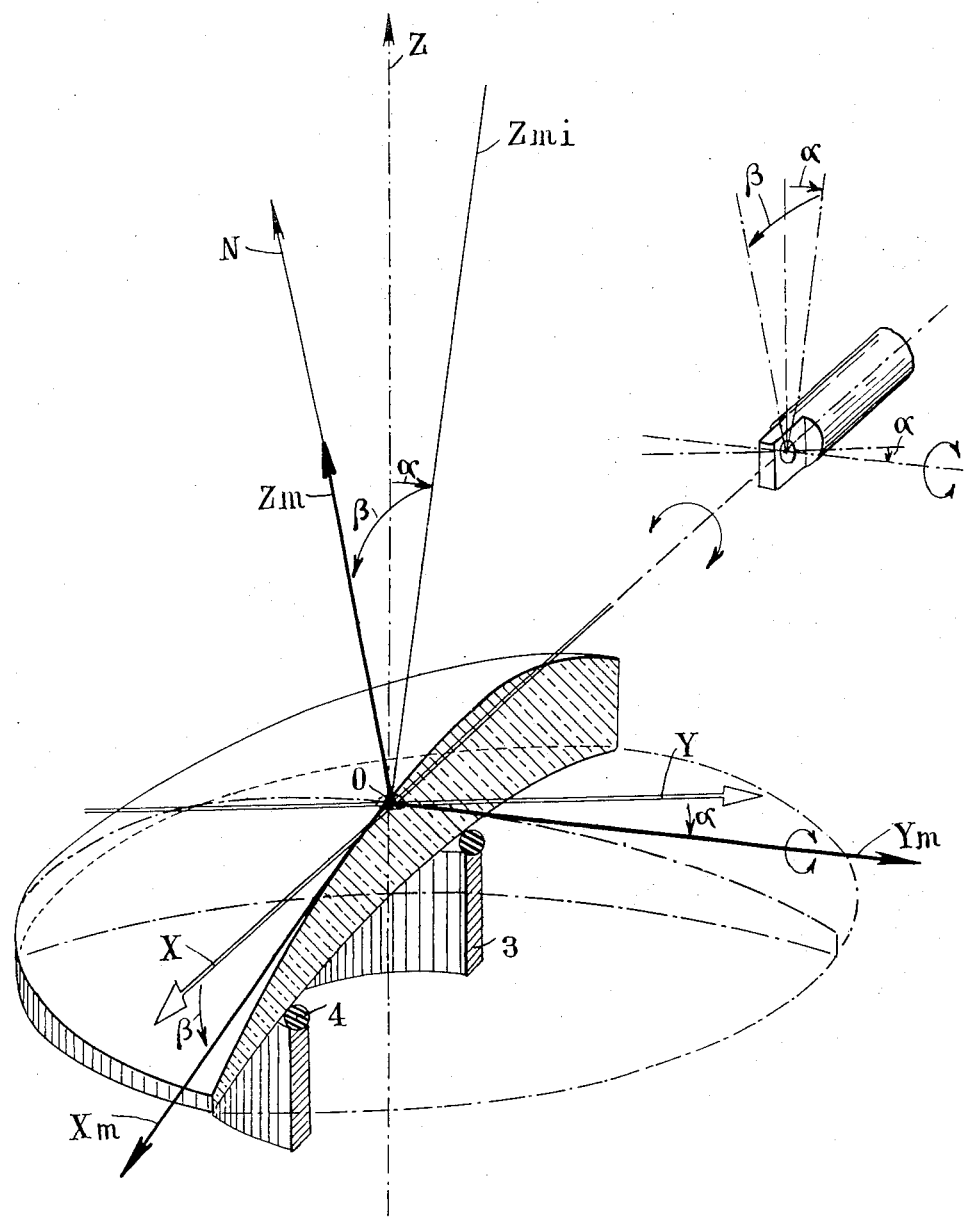
FIG. 1 is a diagrammatic illustration of the basic principle of operation of the positioning and holding device of this invention, showing notably the axes of rotation of the mould.

Reference will firstly be made to FIG. 1 illustrating the principle on which the present invention is based. However, before describing this principle in detail, it is deemed that certain general data should be reminded in order to afford a clearer understanding of the diagram of FIG. 1. In the technique consisting in casting a gland or metal block on the convex face of an ophthalmic lens the mould used to this end comprises impressions or projections adapted to form on the metal block complementary corresponding projections or impressions, respectively, which, when the lens carrying its metal block is subsequently mounted on the spindle of a trimming and bevelling machine, not only permit of rotatably driving the metal block and the lens through the machine spindle, but also constitute a reference system for centering and determining the angular position of the metal block and lens assembly in relation to said spindle on which a trimming templet is also mounted by means of a reference system identical with the aforesaid reference system. Consequently, the impressions and/or projections formed in the mould cavity constitute a reference system that can be represented by three mutually orthogonal axes $X_m$, $Y_m$ and $Z_m$ to be referred to hereinafter as the mould axes, with $Z_m$ constituting the homologue of the axes of the spindle of the trimming and bevelling machine. Moreover, before casting a gland on an ophthalmic lens, this must be centered and positioned in relation to a reference system identical with that of the trimming templet. To this end, a centering device, for example of the type disclosed in the aforementioned French Pat. No. 1,493,482 is used; more particularly, the lens to be centered is placed on this device, with the concave face down, upon a circular seat of which the axis is merged into a sighting axis along which the lens will be observed, this device comprising means for forming an image of the reference cross-line centered to the sighting axis and superposed to the lens. This lens, when observed along said sighting axis, may then be positioned in relation to the image of this reference cross-line. The two arms of the image of this cross-line are represented by the axes X and Y in FIG. 1. considering these various explanatory elements, the mould may be said to be properly positioned and seated on the convex lens face if its center 0 (point of intersection of axes $X_m$, $Y_m$ and $Z_m$) is brought on the sighting axis Z, if its axis $Z_m$ is caused to coincide with the normal N to the convex surface of the lens, at the center thereof, and if one of the other two axes $X_m$ and $Y_m$, for example axis $Y_m$, is kept in the plane formed by the sighting axis and the homologue arms of said reference cross-line for example, in the case of $Y_m$, in the plane formed by the axes Z and Y. Assuming on the one hand that the mould centre O has been moved to a position of coincidence with the sighting axis and on the other hand that the mould axis $Z_m$ is initially merged in the sighting axis while its axes $X_m$ and $Y_m$ are merged in, or parallel to, the arms X and Y of the reference cross-line, respectively, the above-mentioned result may be obtained by causing a first rotational movement of the mould through an angle $\alpha$, about the axis X, so that the mould axis $Z_m$ is brought to an intermediate position $Z_{mi}$ and its other axis $Y_m$ is brought to the position illustrated in FIG. 1 in the plane formed by said axes Y and Z, then another rotational movement through an angle $\beta$ about the axis $Y_m$, so as to bring the mould axis $Z_m$ from said intermediate position $Z_{mi}$ to the position shown in FIG. 1 and the mould axis $X_m$ to the position also shown in FIG. 1.

Now various forms of embodiment of the device of this invention, for producing these rotational movements of the mould, will be described in detail.

Figure 2:
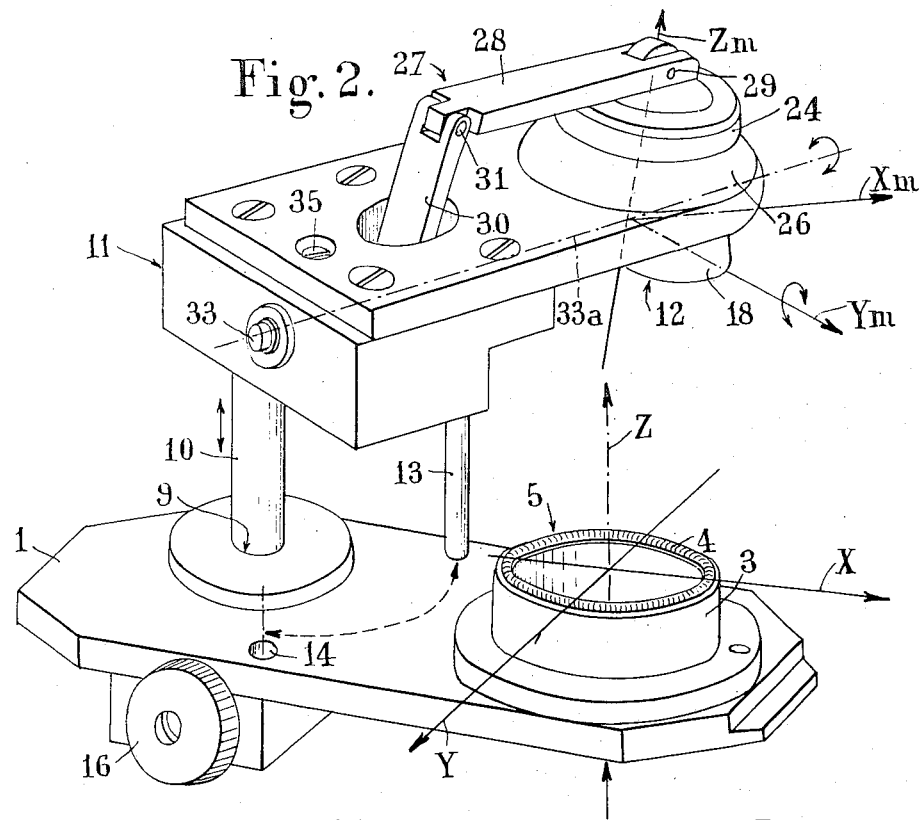
FIG. 2 is a perspective view of a specific form of embodiment of the positioning and holding device of this invention, the mould support of this device being shown in its clearing position.
Figure 3:
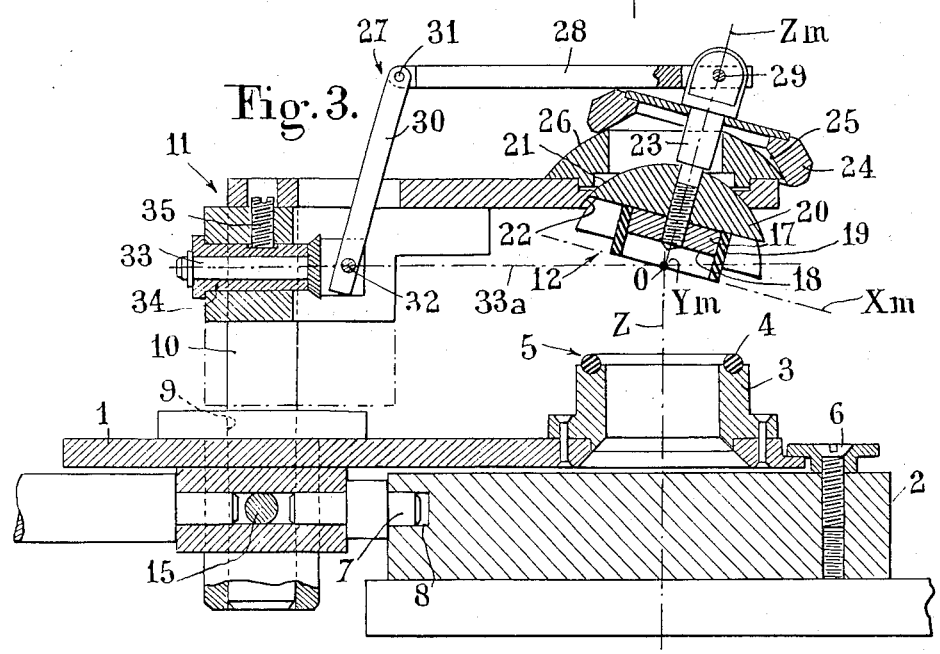
FIG. 3 is a side elevational and sectional view of the device shown in FIG. 2, with the mould support of the device shown in its moulding position.

Referring first to FIGS. 2 and 3 of the drawings, which illustrate a first form of embodiment of the present invention, the device comprises a base plate adapted to be laid on and secured to the frame structure 2 of a centering device for example of the type disclosed in the above-mentioned French patent. This base plate 1 carries a cylindrical support 3 providing along its upper edge lined with a flexible O-ring 4 a circular seat 5 adapted to receive the concave face of an ophthalmic lens. The base plate 1 is held against motion in relation to the frame structure 2 of the centering device (not shown) for instance by means of a screw 6 engaging a tapped hole in said frame structure and a positioning stud or pin 7 engaging a plain blind hole 8 in said frame structure. The base plate 1 may thus be locked in such position that the axis of the circular seat 5 be coincident with the sighting axis Z of the centering device.

Moreover, the base plate 1 comprises a vertical bore 9 having its axis parallel to that of said circular seat 5 and therefore also to the axis Z, said bore 9 being adapted to receive in sliding fit relationship a cylindrical pintle 10 rigid with a mould carrier 11.

In addition to this mould 12 the mould carrier 11 also carries a positioning pin 13 parallel to said pintle 10 and adapted to engage a blind bore 14 formed in said base plate 1. Said positioning pin 13 is shorter than said pintle 10. Thus, when the component elements of the device of this invention are in the relative positions illustrated in FIG. 2, showing a clearing position in which the mould carrier 11 has been moved away from the seat 5 to permit the observation along the sighting axis Z of the lens laid on said seat 5, the pintle 10 remaining however engaged in its bore 9, it is possible, while the positioning pin 13 is somewhat spaced from the top surface of base plate 1, to rotate the mould carrier 11 about the axis of pintle 10 until this positioning pin 13 is plumb to the relevant bore 14. Then, the mould carrier 11 can be lowered to its moulding or operative position by causing said pintle 10 and pin 13 to slide downwards into the relevant bores 9 and 14, until the mould 12 engages the upper convex surface of the lens disposed on the seat 5. In the above-defined moulding position the positions of the mould carrier 11 and therefore of mould 12, as will be explained presently, are accurately determined in relation to the image of a reference cross-line delivered by optical means (not shown) normally incorporated in the centering device (not shown) operated in conjunction with the device of the present invention. The reference cross-line image is centered to the sighting axis Z of the centering device and the arms of the image cross-line merge in, or are parallel to, the axes X and Y illustrated in FIG. 2.

Clamping and locking means consisting for example of a tightening screw 15 operable by means of a knurled knob 16, are provided for locking the mould carrier 11 after the mould 12 has been brought into holding contact with the convex surface of the lens carried by the seat 5.

Of course, it would not constitute a departure from the basic principle of this invention to have the pintle 10 rigid with the base plate 1 and the bore 9 formed in the mould carrier 11, in lieu of a pintle 10 rigid with the mould carrier 11 and a bore 9 formed in the base plate 1. The same applies to the positioning pin 13 and bore 14.

As shown more particularly in FIG. 3, the mould 12 comprises a body 17 providing a flat bottom 18 for the moulding cavity, and a flexible skirt 19 surrounding said body 17 and constituting the side walls of said moulding cavity. An opening (not shown) is formed through said skirt 19 to permit the casting of a low-melting metal into the moulding cavity when the mould 12 is pressed against the convex surface of the lens. The free edge of the skirt 19 which is to engage the convex surface of the lens lies in a plane substantially parallel to the flat mould bottom 18. The mould 12 is secured to a block 20 having a part-spherical or dome-shaped upper surface 21, so that the centre of the sphere from which said dome is taken lies at the mould centre O, i.e. substantially in the plane containing the free edge of skirt 19. In practice, this point O may lie either in said plane or slightly inwards of the moulding cavity of mould 12, but not in excess of about 2 millimeters from this plane.

The spherical portion 21 of block 20 co-acts with a frustoconical bearing surface 22 formed in the mould carrier 11, whereby the axis of the cone from which said frustoconical bearing surface 22 is taken merges in the moulding position of mould carrier 11 into the axis of said circular seat 5 and therefore into the sighting axis Z. The part-spherical surface 21 engages said frustoconical bearing surface 22 when the block 20 is moved upwards, for instance as a consequence of the bearing engagement between the mould 12 or more particularly its skirt 19 and the convex surface of the lens laid on the seat 5. To prevent the block 20 from being separated from the mould carrier 11, the block 20 is connected, through the medium of an axial shank 23, to a ring member 24 formed with a frustoconical bearing surface 25 facing said part-spherical bearing surface 22 and belonging to a cone the axis of which is coincident with the axis of the aforesaid part-spherical or dome-shaped surface 22. This axis, passing through the mould centre O is perpendicular to the mould bottom 18 and also to the plane containing the free edge of said skirt 19, and is on the other hand coincident with the axis $Z_m$ of mould 12. The frustoconical bearing surface 25 engages a part-spherical surface 26 formed on a ring block rigid with the mould carrier 11, concentrically to the sphere from which the aforesaid dome-shaped surface 22 is taken; therefore, the axis of surface 23 is coincident with that of the frustoconical bearing surface 22 and also with the sighting axis Z in the moulding position.

A linkage mechanism designated in general by the reference numeral 27 is provided for guiding the movements of block 20. This mechanism 27 comprises a first link 28 pivotally connected at one end to the head of the aforesaid shank 23 through a pivot pin 29 and at its other end to one end of another link 30 by means of a pin 31 parallel to pin 29. This other link 30 is pivotally connected in turn, at its opposite end, by means of a pin 32 also parallel to pins 29 and 31, to a cylindrical rod 33 rotatably mounted in a sleeve 34 acting as a bearing and held against movement by a set screw 35 in a bore formed in the mould carrier 11. This bore is so machined in the mould carrier 11 that its axis 33a (which is also the axis of rod 33) extends through the centre of the sphere from which the spherical portion 21 is taken, or in other words the centre O of mould 12. Moreover, the pivot pin 32 intersects the axis 33a. As shown in FIG. 3, the set of links and pivot pins constituting the linkage 27 acts as a parallel motion adapted, in addition, to pivot about one of its sides, namely the axis 33a which is fixed in relation to the mould carrier 11, and also about another axis fixed in relation to the mould 12 and which, when the links 28 and 30 lie in the plane of FIG. 3, is perpendicular at O to the plane of this Figure. This second axis corresponds to the axis $Y_m$ of FIG. 1.

In order to enable the two movements of rotation of the mould 12 to take place under the conditions specified hereinabove with reference to the diagram of FIG. 1, when the mould carrier 11 is in the moulding position (with pin 13 engaging the relevant bore 14), the centre of rotation O of the mould must lie on the axis of seat 5 coincident with the sighting axis Z of the centering device) and the axis 33a must merge in, or be parallel to, the arm X of the image of the reference cross-line. Now these various requirements can be met very easily when mounting the device of this invention on the frame structure 2 of the centering device to be associated therewith, for example by inserting the positioning stud 7 into the hole 8 of frame structure 2.

The device described hereinabove with reference to FIGS. 2 and 3 operates as follows. This device is firstly set in the manner explained hereinabove on the frame structure 2 of a suitable centering device, for example of the type disclosed in the above-mentioned French patent, with the mould 11 in the position shown in FIG. 2; a spectacle lens to which a metal block is to be fitted is laid on the seat 5 with its concave surface down, and then observed along the sighting axis Z of the centering device and suitably positioned in relation to the arms X and Y of the image of the reference cross-line. Then, by rotating the mould carrier about the axis of pintle 10 and by translation of this mould carrier downwards, in a direction parallel to the axis of pintle 10, the mould 12 is pressed against the upper convex face of the spectacle lens. Due to the possibility of rotating the mould about the axis $Y_m$ and also about the axis 33a, parallel to the arm X of the reference cross-line image, the mould 12 assumes automatically the proper position so as to properly bear against the convex surface of the lens; once the mould has thus been disposed on the lens, it is only necessary to lock it in this position by actuating the clamping and tightening means 15, 16 for preventing the mould carrier 11 from being lifted up. The positioning and holding device according to this invention may then be removed from the frame structure 2 of the centering device associated therewith, and brought to a casting station whereat a low-melting metal is poured into the mould cavity to form a metal block or acorn adhering to the convex lens surface and permit the subsequent mounting of the lens on the spindle of a trimming and bevelling machine.

FIG. 4 illustrates in perspective and exploded view, with parts broken away, a modified form of embodiment of the mould carrier, the base plate remaining unchanged. In the mould carrier 11 illustrated in FIG. 4 the mould 12 proper is carried by a semi-cylindrical block 36 having its axis substantially in the plane containing the free edge of the mould skirt, or slightly above this plane, at a distance therefrom not in excess, preferably, of about 2 mm. This semi-cylindrical block 36 is rotatably mounted about said axis in any suitable way, in a head 37 constituting a first section of the mould carrier 11. For instance, the semi-cylindrical block 36 may be rotatably mounted in the head 37 through a row of balls 38 adapted to roll in circular grooves 39 formed in the end walls of said semi-cylindrical block 36 and in opposite circular grooves 40 formed in the side plates 41 secured by screws 42 to the side faces of head 37. This head 37 is rotatably mounted in turn, by means of a suitable bore 43, about a shaft 44 rigid with the second section 45 of the mould carrier to which the pintle 10 and the positioning 13 are secured. The common axis of said bore 43 and shaft 44 is perpendicular to the axis of said semi-cylindrical block 36 and these two axes intersect each other at the mould centre O which, when the mould carrier is in its moulding position, lies on the axes of the base-plate seat. The axis of said semi-cylindrical block 36 and the axis of bore 43 and shaft 44 correspond respectively the axes $Y_m$ and 33a of FIGS. 2 and 3, so that the same reference symbols are used for designating them.

As in a ball-bearing, the balls 38 are retained by cages or separators 46 each provided with a pair of opposite stop elements 46a (only one of these stop elements being visible in FIG. 4, one per cage) which, by engaging the screws 42, are adapted to limit in either direction the amplitude of the angular movement of the semi-cylindrical block 36 about the axis $Y_m$.

FIGS. 5 and 6 illustrate another modified form of embodiment of the mould carrier 11, the base plate remaining unchanged. In this second modified form of embodiment, which is very similar to that illustrated in FIG. 4, the mould 12 is also secured to a semi-cylindrical block 47 co-acting in the upward direction with a pair of flat bearing surfaces 48 formed on the head 49 constituting a first section of the mould carrier 11. The semi-cylindrical block 47 is both retained in the axial direction, with a moderate axial play, and rotatably supported by a pair of lateral plates 50 rigid with the head 49 and each provided with an internal cylindrical bearing surface 50a co-acting with a cylindrical chamber 47a of complementary configuration formed in the semi-cylindrical block 47. The axis of this semi-cylindrical block 47, the axis of the cylindrical bearing surface 50a and the axis of the cylindrical chamber 47a are merged into one and also coincident with the mould axis $Y_m$.

Secured to the head 49 is a shaft 51 trunnioned in the second section 52 of the mould carrier 11 by means of a pair of ball-bearings 53 and 54. These ball-bearings and the aforesaid shaft 51 have the same function as the bore 43 and shaft 44 of the preceding form of embodiment shown in FIG. 4. As in the preceding case, the axis of shaft 51 is perpendicular to the axis $Y_m$ of the semi-cylindrical block 47 and these two axes intersect each other at the centre mould O lying as in the preceding example substantially in the plane containing the free edge of the mould skirt 19 or somewhat within the mould cavity, at a distance not in excess of about 2 mm from said plane. from a Of course, it will readily appear to those conversant with the art that the specific forms of embodiment shown and described herein should not be construed as limiting the scope of the invention since varous modifications and variations may be brought thereto without departing from the spirit and scope of the invention as set forth in the appended claims.

What I claim is:

1. Device for positioning and holding in the proper location, on the convex face of an ophthalmic lens, a mould for casting, on said lens face, a metal block permitting the subsequent mounting of the lens equipped with said metal block in a predetermined position on the spindle of a spectacle-lens trimming and/or bevelling machine, said lens being observed, for positioning same, along a sighting axis and superposed to the fixed image of a cross-line centered to said sighting axis, this device comprising a base plate carrying a circular seat having its axis coincident with said sighting axis and adapted to receive the concave face of said lens; a mould support movable in relation to said base plate from a seat clearing position permitting the observation of said lens along the sighting axis to a moulding position permitting of bringing a mould into direct contact with the convex face of the lens; a mould movable in relation to said mould support and comprising a substantially flat bottom and a flexible lateral skirt surrounding said bottom and having a free edge adapted to engage the convex face of said lens and extending in a plane substantially parallel to said bottom; means for positioning said support in the moulding position, which are associated with guide means permitting a movement of translation of said support when said support is in the moulding position, parallel to the seat axis; first means for guiding said mould during rotational movements thereof about a first axis fixed in relation to said support, said first axis, in the moulding position of said support, being parallel to one arm of the image of the cross-line and secant and perpendicular to the seat axis; and second means for guiding mould during the rotational movements thereof about a second axis fixed in relation to said mould, said second axis being secant perpendicular to said first axis, the point of intersection of said first and second axes being located substantially in the plane containing the free edge of said mould skirt, and, in the moulding position of said support, on the seat axis proper.

2. Device as set forth in claim 1, wherein the point of intersection between the two axes of rotation of the mould is located in the inner space of the mould, in close vicinity of the plane containing the free edge of said mould skirt.

3. Device as set forth in claim 2, wherein said point of intersection lies at a distance not in excess of about 2 mm from said plane.

4. Device as set forth in claim 3, wherein said means for guiding said mould support during its movements of translation comprise a pintle parallel to the seat axis and extending from said base plate to said support, one end of said pintle being secured to one of said base plate and mould support, the other member, namely the mould support or the base plate, being formed with a bore adapted to be slidably engaged by said pintle, and said positioning means comprise said pintle and a positioning pin parallel thereto, said pin being shorter than said pintle and secured to one of said base plate and mould support, and co-acting, when said mould support is in its moulding position, with a bore formed in the other member.

5. Device as set forth in claim 4, wherein means are provided for locking said pintle in the corresponding bore.

6. Device as set forth in claim 4, wherein said mould support comprises two main sections, the first section supporting the mould and the other being associated with said pintle, said two sections being pivotally interconnected through a pivot pin constituting the first means for guiding the mould during its rotational movements, said second means for guiding the mould during its rotational movements consisting of a semi-cylindrical block having secured thereto the mould body and being adapted to engage a semi-cylindrical bearing surface of complementary shape formed in said first section of said mould support, the axis of said pivot pin and the axis of said semi-cylindrical block being coincident with said first and second axes of said first and second guide means, respectively.

7. Device as set forth in claim 4, wherein said mould is secured to a spherical portion co-acting with an annular bearing surface formed on said mould support and further comprises a linkage of the link and pivot pin type for guiding the movements of said spherical portion on the bearing surface associated therewith along the first and second axes of said first and second guide means.

* * * * *